(12) United States Patent
Ohlin

(10) Patent No.: US 8,491,223 B2
(45) Date of Patent: Jul. 23, 2013

(54) WATERING DEVICE, METHOD FOR MANUFACTURING SAID DEVICE, AND MEANS THEREFOR

(75) Inventor: Börje Ohlin, Mölltorp (SE)

(73) Assignee: Terrigio AB, Mölltorp (SE)

( * ) Notice: Subject to any disclaimer, the term of this patent is extended or adjusted under 35 U.S.C. 154(b) by 409 days.

(21) Appl. No.: 12/811,683

(22) PCT Filed: Jan. 8, 2009

(86) PCT No.: PCT/SE2009/050006
§ 371 (c)(1),
(2), (4) Date: Jul. 2, 2010

(87) PCT Pub. No.: WO2009/088354
PCT Pub. Date: Jul. 16, 2009

(65) Prior Publication Data
US 2010/0284744 A1  Nov. 11, 2010

(30) Foreign Application Priority Data
Jan. 9, 2008  (SE) ...................................... 0800045

(51) Int. Cl.
*A01G 25/00* (2006.01)
*E02B 13/00* (2006.01)

(52) U.S. Cl.
USPC .......... 405/36; 47/79; 47/81; 239/44; 239/45; 405/43; 264/286

(58) Field of Classification Search
USPC . 47/79, 81; 239/44, 45, 50, 145, 326; 405/36, 405/43; 138/40, 165; 264/286, 505, 506, 264/508; 428/128, 129
See application file for complete search history.

(56) References Cited

U.S. PATENT DOCUMENTS

| | | | | |
|---|---|---|---|---|
| 4,287,682 A | * | 9/1981 | Browne | 47/81 |
| 4,339,891 A | * | 7/1982 | Bassett | 47/71 |
| 4,397,114 A | * | 8/1983 | Skaife | 47/81 |
| 5,050,343 A | * | 9/1991 | Henttonen | 47/79 |
| 7,392,616 B1 | * | 7/2008 | Bagby | 47/65.9 |
| 2002/0071721 A1 | * | 6/2002 | Gearhart | 405/37 |
| 2008/0035753 A1 | * | 2/2008 | Sheldrake et al. | 239/50 |

\* cited by examiner

*Primary Examiner* — David Bagnell
*Assistant Examiner* — Benjamin Fiorello
(74) *Attorney, Agent, or Firm* — Potomac Patent Group PLLC

(57) ABSTRACT

A device for watering purposes, a method for the manufacture thereof, as well as means for the manufacture thereof are disclosed. The device includes a water-collecting container extending along the intended desired area to be watered. Internally in the container, there is a transverse double partition wall, which extends from the base portion of the container up to at least half the effective height of the container. Along the outside of the container, a liquid-sucking wick extends that is connected to the internal liquid-receiving spaces of the container at a mutual distance from each other, as seen along the length extension of the container.

17 Claims, 10 Drawing Sheets

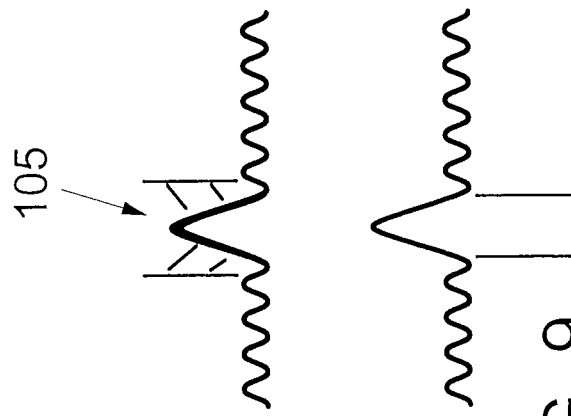
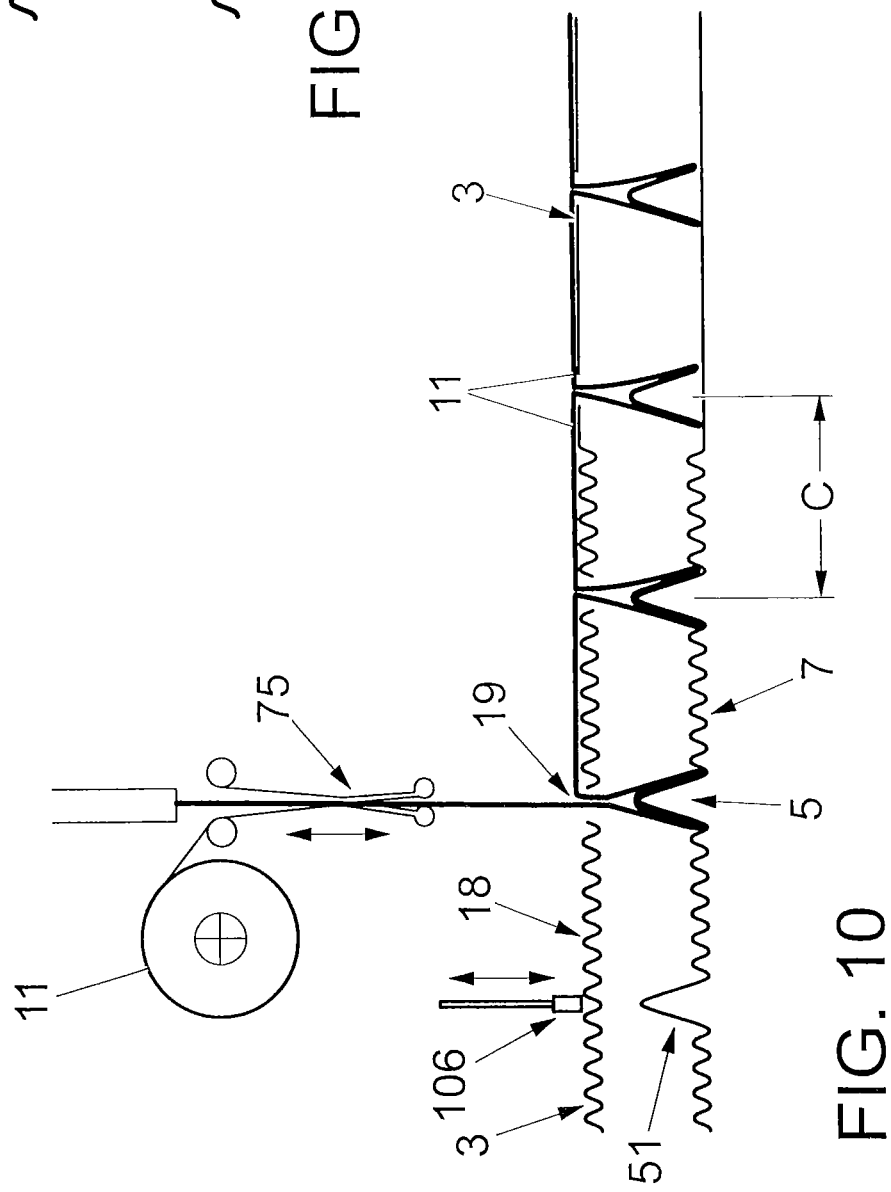
FIG. 9
FIG. 10

WATERING DEVICE, METHOD FOR MANUFACTURING SAID DEVICE, AND MEANS THEREFOR

BACKGROUND

The present invention relates to a device for watering purposes and comprising a water-collecting housing or container that extends along the intended desired area to be watered and is arranged to be received in the ground.

During the last 40-50 years, we have, in the Western World, improved arable lands and lands by draining off, in order to increase, simplify processing and to increase the productivity of the lands. Enormous surfaces have been underdrained in order to be able to sow earlier, and large surfaces that have had a swamping-tendency have come into use thanks to underdrainage. But this has not only been beneficial. Afterwards, we can see resulting effects such as environmental influence on animal species and too quick dewatering of the rain that falls, with lowered groundwater levels as a consequence. However, the fundamental idea in the Western World has been to create large efficient production surfaces for cereals, production of vegetables, fruit and berries as well as also forest areas having better conditions.

The plastics industry, which has had the drain hose as main product, has had great success. There is a well-developed machine equipment for laying drain hoses, even if the market now begins to become saturated. Enormous surfaces are today dewatered efficiently.

However, globally seen, we are facing an enormous deficiency of water as regards fresh water. The food production in the world takes, to a great extent, place in highly industrialized agricultural countries using efficient implements and relatively good supply of rainfall or conducted water. All curves, however, indicate an immediate food scarcity in the world.

Sprinklers above ground provide very low investment costs but involves extremely high water consumption and a very great loss of water compared to the result of produced crops. In addition, they require high-pressure water of uniform pressure.

Pressurized drip hoses/moisture hoses require relatively low investment costs. Certain types can be placed under ground with direct moistening at the root zone. However, the disadvantage of these solutions is that they require very clean water and water under a constant pressure. But above all, these facilities do not at all resist any damage in the form of bite damage or other sabotage. Well-developed technology is a requirement in order for these to work.

MPS watering system, see, for instance, EP 382 816 B1, is a similar system, but which unfortunately is too complicated to lay. It is too expensive to use on larger surfaces and it requires a very great effort upon laying. Neither can it be laid in sloping systems. Thus, by this known solution provided with a single wall, it is not possible to provide a watering system having double-sided capability of water-raising by applying a wall for maximum utilization in leaning placement in any direction.

SUMMARY

Therefore, the main object of the present invention and the main operation area thereof is primarily to give countries and federal states having small water resources the capability of producing cereals, vegetables, citrus plants, fruits as well as forest plants. This is realized by utilizing a proceeding reverse to the draining that hitherto have been done in other countries having an abundance of water as their problem.

By the present invention, drain hoses are changed to supply water slowly under the ground directly to the root zone of the plant material, without water pressure. This entails that the water consumption is about 10% of what conventional watering of plant materials requires in hot areas. Additional objects attained are, among others: possibilities of establishment of trees in desert expansion areas; vegetable gardening on a small village scale with limited supply of water and technology; large-scale cultivation of seeds, vegetables, fruits and forests without access to greater amounts of pressurized water, with 10% of water consumption, and; to provide a product the simplicity of which allows it to be dug down both manually and mechanically.

The product has also, by means of the simplicity thereof, other fields of application in developed countries where it can compete with more expensive and complicated systems in order to supply water on a small scale in winter gardens, parks and squares in plant islands etc., where systems supplying pressurized water are not the choice.

The potential of the product, correctly used, may afford certain countries a hundredfold greater food production compared to today with the same level of water consumption. Totally for the world production of food, the potential is 10-30% greater food production with this product. Tree establishment in awkward areas may yield 90% better outcome than today.

Said object is attained by means of a device according to the present invention that essentially is characterized in that, internally in the container, there is a transverse double partition wall, which extends from the base portion of the container up to at least half the effective height of the container, that along the outside of the container, a liquid-sucking wick extends that is connected to the internal liquid-receiving spaces of the container at a mutual distance from each other, as seen along the length extension of the container, that the wick is arranged to extend through openings on the upperside of the container to base portions of the container at the area of the respective partition wall on each side of the same, the active suction capacity of the wick between container compartments provided being interrupted in order to prevent water transportation by means of the wick between the container compartments.

Advantages of the Construction non-pressurized system;
can advantageously be laid unevenly;
can be laid in sloping laying fashion;
resists certain sabotage without too great a loss of water;
long service life;
simple laying with or without technical aids;
cuts down the water consumption in comparison with drip and sprinkler solutions;
the water consumption with direct application at the root zone provides water saving of a ratio of 1:6-1:10 in comparison with surface application;
can be embodied in an economically maintainable way for the production of plants to be produced by means of the system;
water filling can be effected both manually and by technically more advanced solutions, and;
can be provided with control sticks, which in addition may work as extra deaeration for faster air evacuation during water filling in long systems.

The invention also relates to a proceeding for the manufacture of a container arrangement consisting of plastic material. Such a proceeding allows efficient manufacture of containers.

Said proceeding is characterized in that artefacts are continuously extruded in the form of thermoplastic pipes, hoses or containers of corrugated design, that portions of the fabricated artefact are subjected to counter-directed motion action for the provision of thickening of the plastic material layer along intended portions of the artefact, that the thickened plastic material layer is the subject of combined mechanical indentation and suction action so that a corrugatedly wall-shaped portion is formed internally in the artefact at a mutual distance from each other, and that excessive plastic material is removed from the area of a formed partition wall, hole making in the artefact formed and attachment of a laid-out wick being allowed to be effected, preferably in the immediately subsequent step.

Finally, the invention relates to means for the manufacture of a device as indicated above.

Said means is essentially characterized in that a machine intended for continuous extrusion of thermoplastic pipes, hoses or containers of corrugated design comprises at least two moulding stations that comprise mutually counter-directed corrugation mats, one moulding station of which is arranged to be driven adversely in the reversed direction in order to thicken the plastic layer along the intended part of the extruded artefact, that a wedge-shaped indentation part is actuatable to indent said thickened plastic layer transversely to the injection direction for the formation of a double-walled transverse wall and subsequent sucking away of excessive plastic material and removal of the same by a suction apparatus.

The basic invention of the product is a tight drain hose having interior partitionings up to approx. 80% of the internal height, which provides water sections. In each end, each section is provided with a water-sucking wick. The water is sucked up in a capillary fashion from the respective section. Each section should not be longer than 50 cm so that the hose can be laid arbitrarily leaning without any appreciable decrease of the water capacity per section. Deaeration holes are drilled on the upperside to prevent negative pressure from arising, so that the capillary force is reduced in the wick.

The wick is made endless in order to make the product reasonable price-wise. An end seal is provided with a water-filling facility. Extension pieces for the hose can be connected. The hose is provided with control pipes at appropriate distances for the use. A reamer for boring of holes may be utilized. In order to avoid too slow water-filling capacity, the hose should be provided with deaeration/control pipes every tenth meter. The hose should be flexible, but the corrugation and the plastic material together should provide such a bearing capacity that light tractors should be able to drive over the product if it is laying at a soil depth of approx. 30 cm without being deformed. The product should be laid planely or leaning slightly downward for optimal utilization. Refilling should occur at the highest point in the pipe system.

However, the liquid-sucking function of the wick is interrupted along the length extension thereof in order to only provide water suction for the respective parted container as seen along the entire length extension of the system.

In awkward hot ground conditions, the product is combined with so-called "container plants" in some form in order to bring down a working root system to the depth to the moisture zone created around the hose at the depth protected from the warm surface soil. These young plants of different species are pregrown under more controlled forms. They may be openable plastic sleeves or of "paper pot type", which today are used within nurseries for forest trees.

The important thing is that the plant material has a good and deep root system.

For large-scale cultivation, there are planting machines for this type of plants. In more advanced layings of the product, it is laid using a chain excavator of the same type that today is used laying drain hoses in Europe.

BRIEF DESCRIPTION OF DRAWINGS

The invention is described below in the form of a preferred embodiment example, reference being made to the accompanying drawings, in which FIG. 10 shows a part of the machine for wick application.

DETAILED DESCRIPTION

Figure 1A:
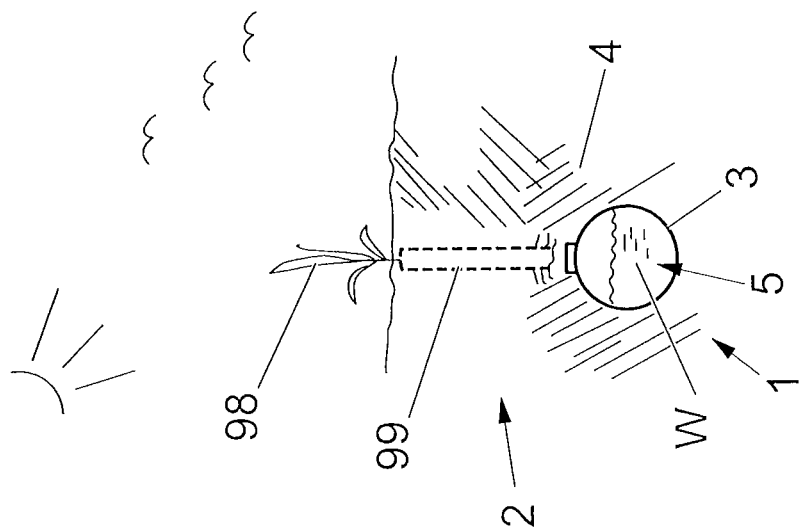
FIG. 1A shows an example of container planting above a watering container.
Figure 1:
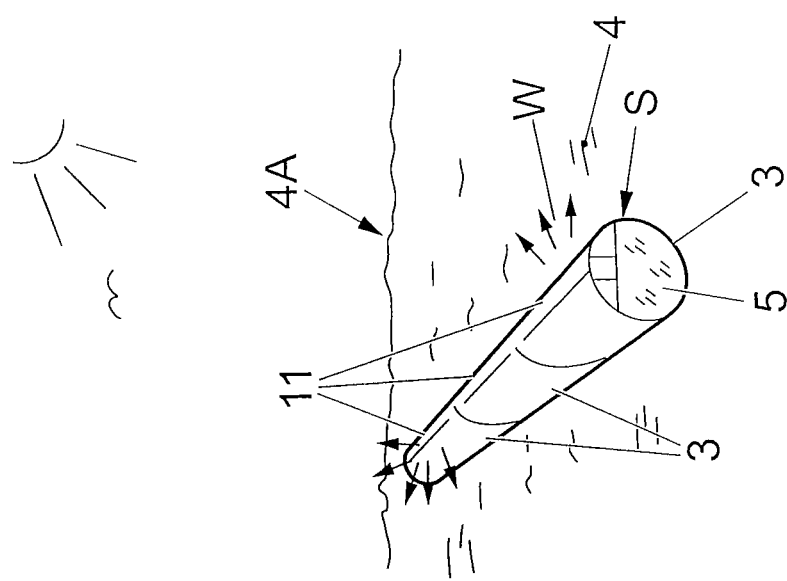
FIG. 1 shows a schematic container according to the invention in active watering state.
Figure 2:
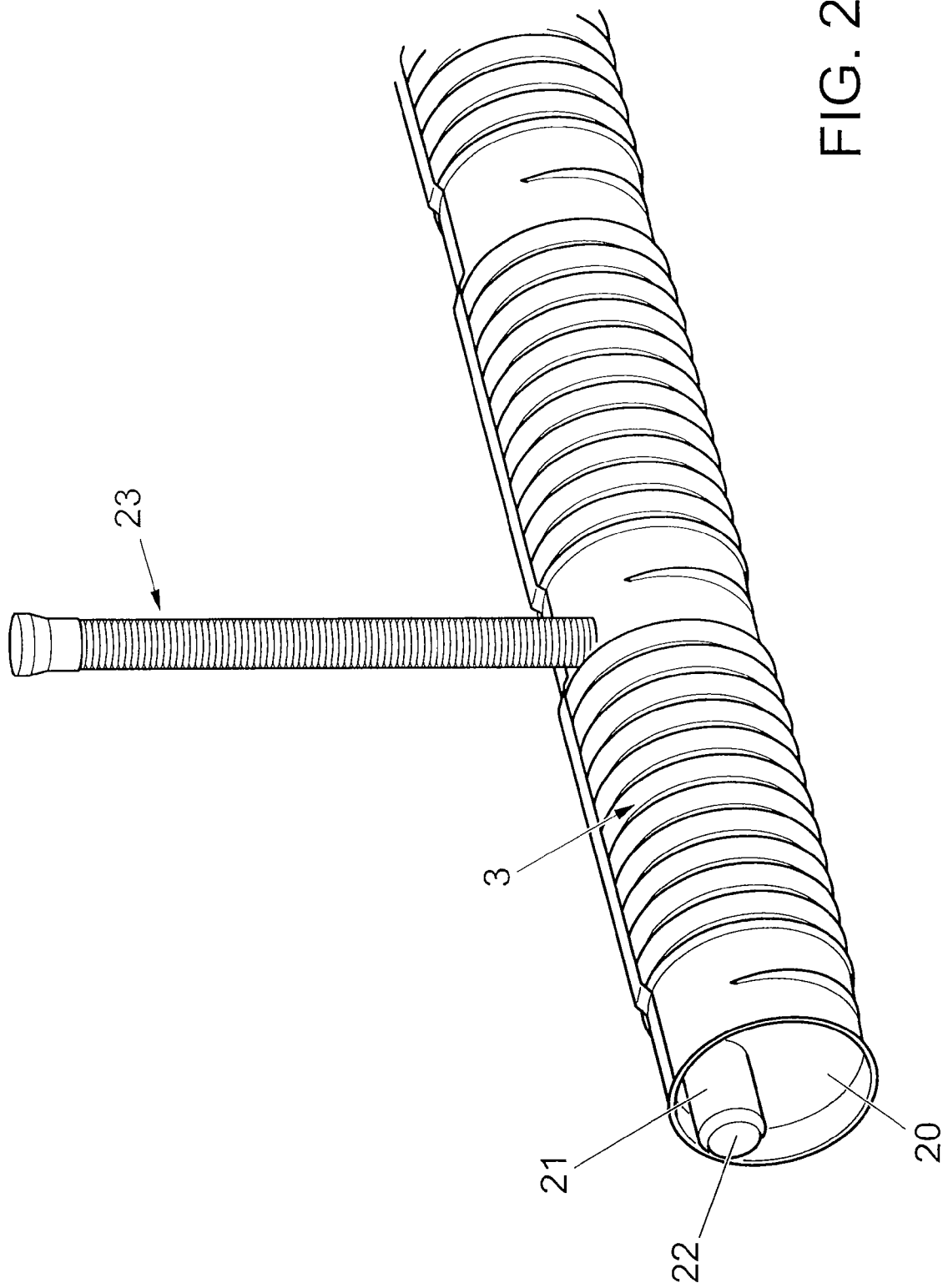
FIG. 2 shows in perspective a watering container having a deaeration pipe.
Figure 3:
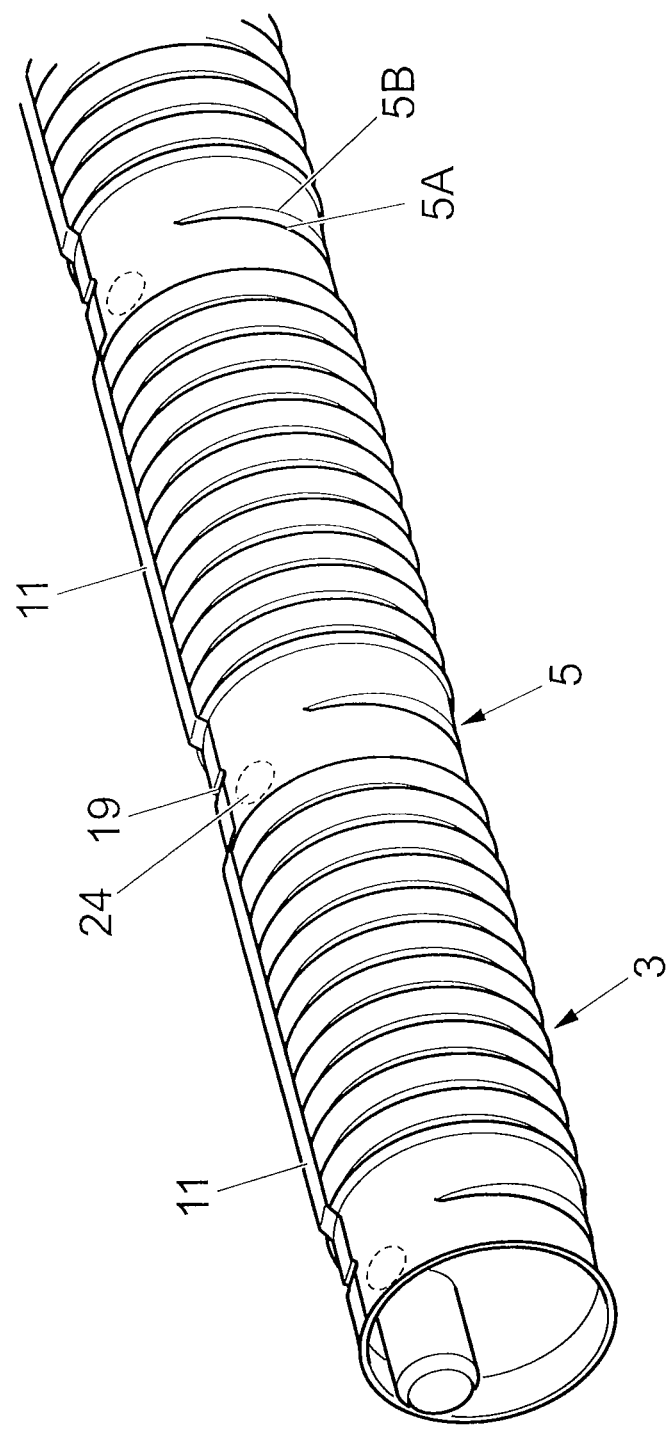
FIG. 3 shows container without a protruding deaeration pipe.
Figure 4:
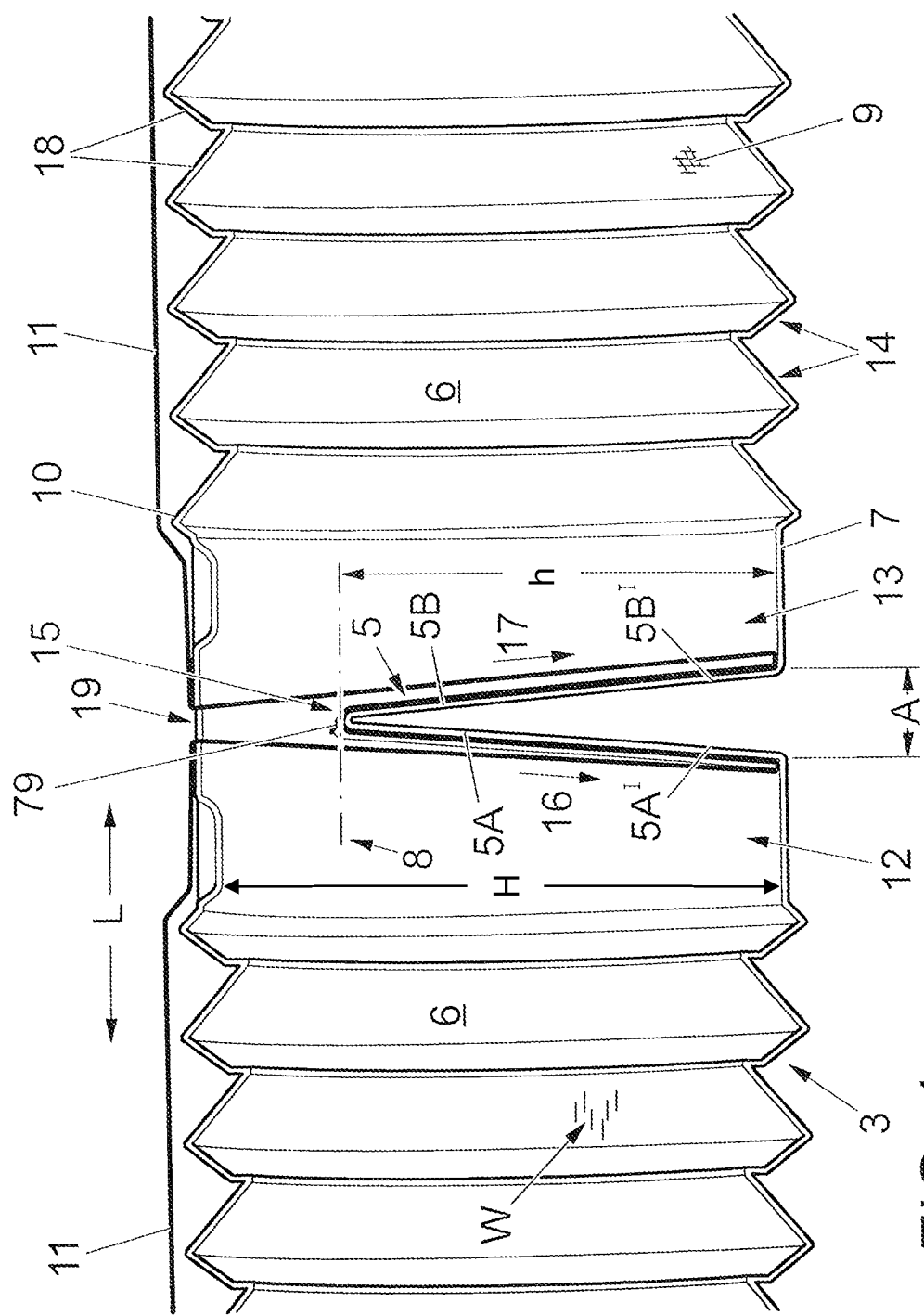
FIG. 4 shows a partitioning wall in the container and with an attached wick.
Figure 5:
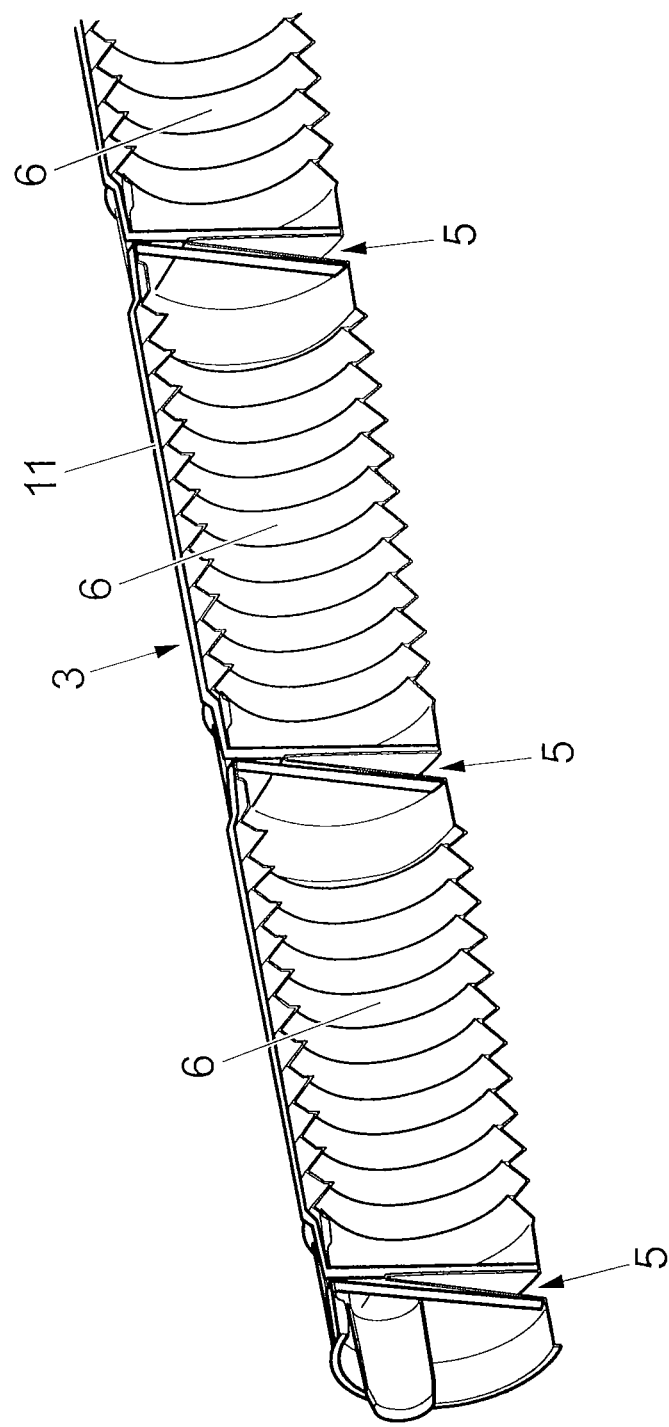
FIG. 5 shows the container in section view and with shown walls and a wick, FIGS. 6-8 schematically show a machine for the fabrication of containers, FIG. 9 schematically shows a part of the machine for material removal.
Figure 6:
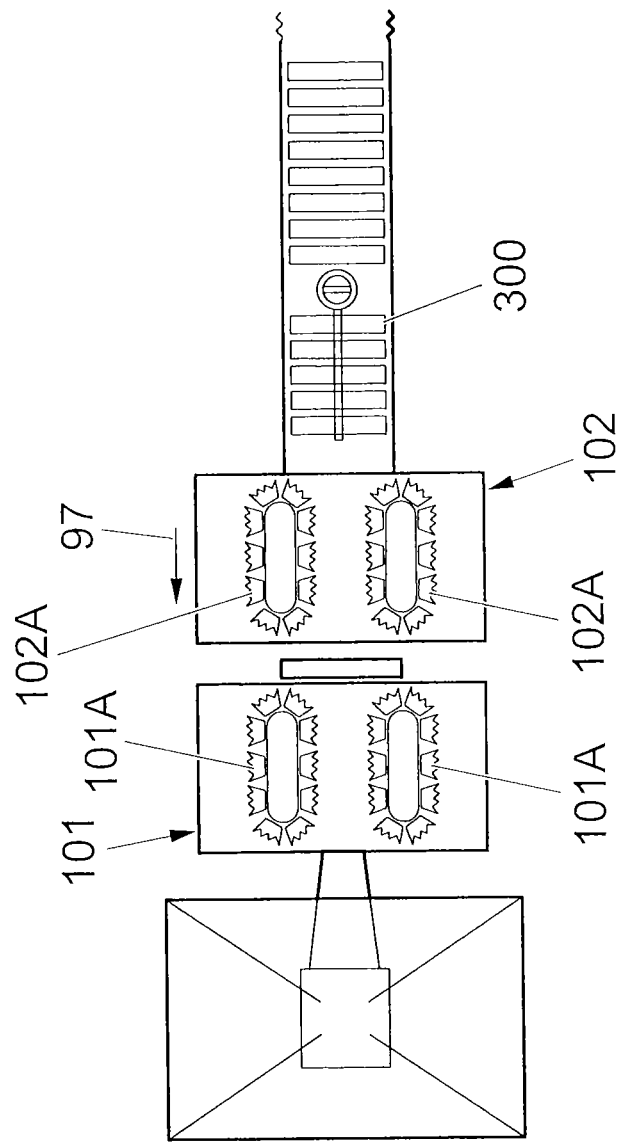
Figure 7:
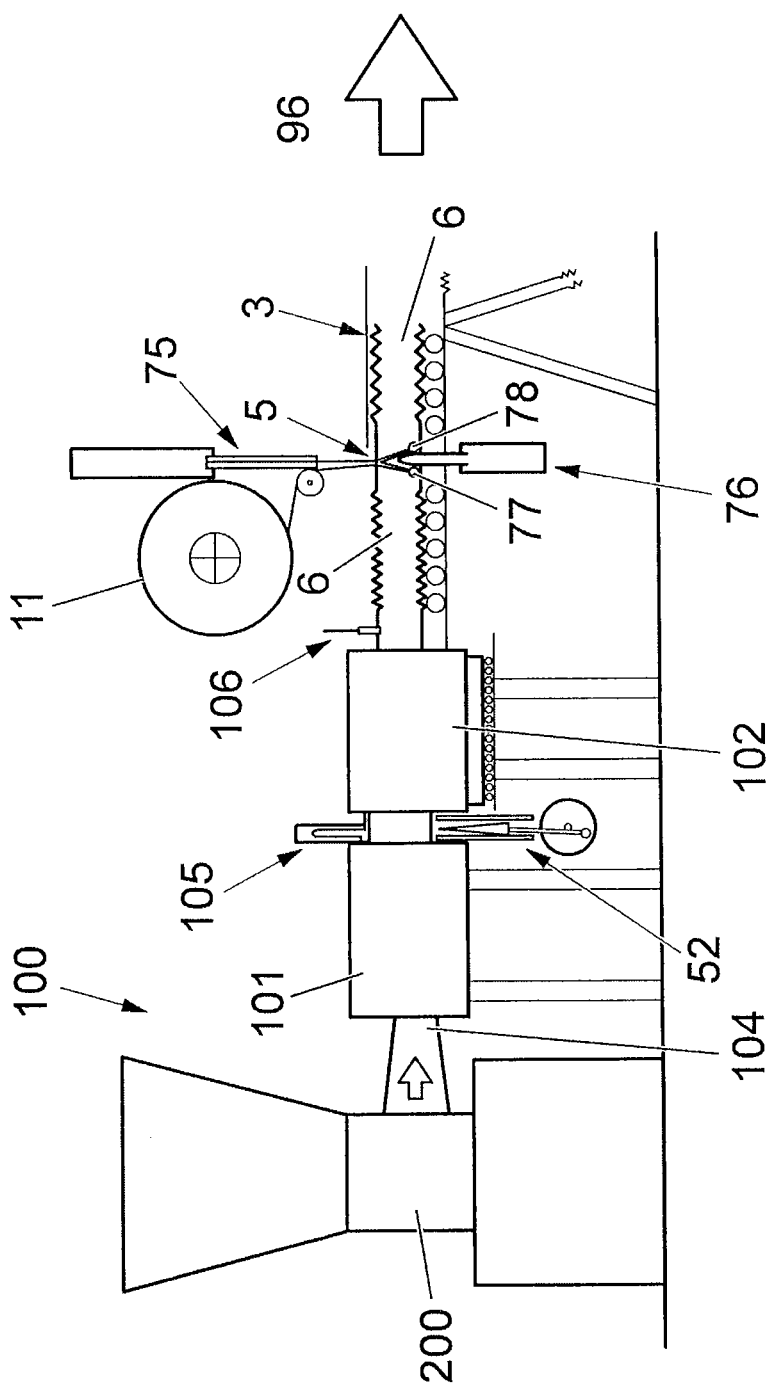
Figure 8:
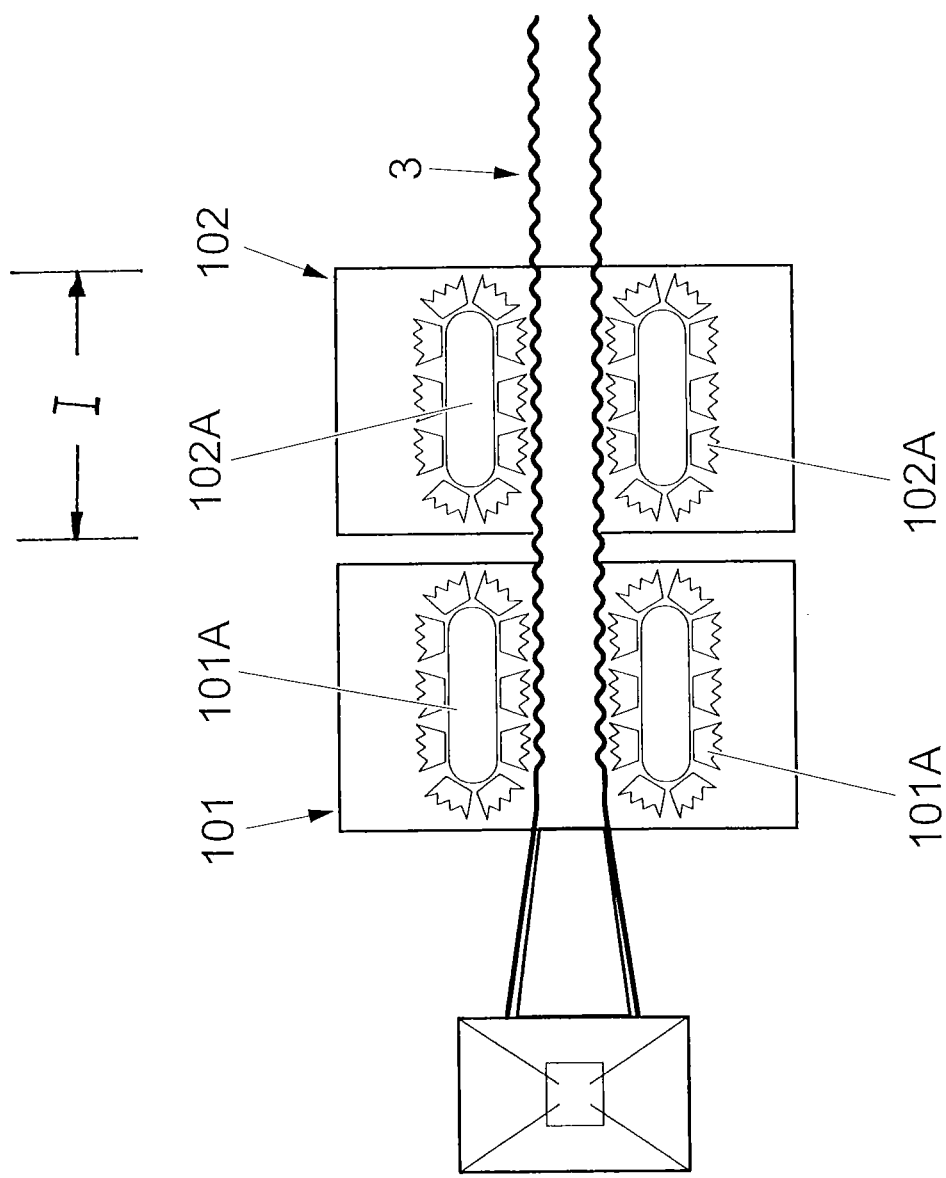
Figure 11:
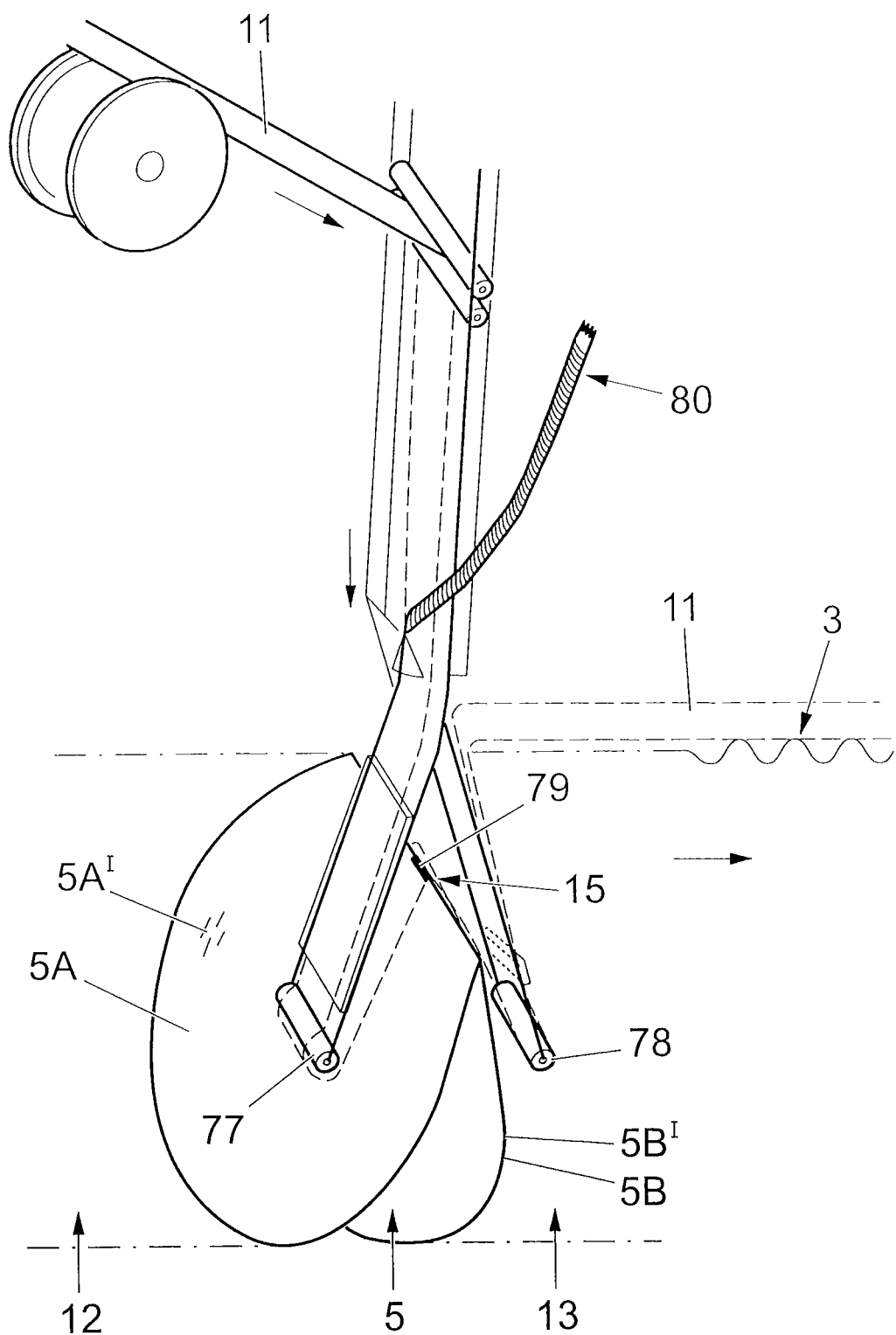
FIG. 11 shows a part of the machine for wick attachment in the container.

More precisely, the invention relates to a device 1 adapted for watering purposes and comprising a water-collecting container 3 that extends along the intended desired area 2 to be watered and is arranged to be received buried in the ground 4. According to the invention, there is a transverse double partition wall 5 in the internal space 6 of the container. Said partition wall 5 extends from the base portion 7 of the container up to a level 8 situated on at least half the effective height h of the container. Along the outside 9 of the container, preferably on the upper half thereof and most preferably on the top 10 thereof, a liquid-sucking wick 11 extends that is connected to the internal liquid-receiving spaces 12, 13 of the container at a mutual distance A from each other, as seen along the length extension L of the container.

The container 3 is preferably tubular or has a similar equivalent shape, e.g., hose-shaped or having an elongate shape, and has a corrugated wall shape 14, as seen along the length extension L of the container. In order to allow desired interconnection of the container 3 to reach the desired areas, the ends of the container 3 are arranged so that they are interconnectable in row form to the desired length. Also different couplings, e.g., T- or X-couplings may be arranged.

Because of the manufacturing method of the containers, the double wall portions 5A, 5B are leaning and more precisely they are diverging from an upper merging, substantially straight top portion 15 in the direction obliquely downward 16, 17 toward the base portion 7 of the container.

In order to allow to be able to lay the container 3 with great inclination in sloping country, without the water of the container 3 flowing out from the same through the lowest situated end thereof, the partition wall 5 extends up to a level 8 of the container 3, which level 8 is at least 80% of the internal height H of the container.

Said wick 11, which consists of a band-shaped fibre fabric, for instance 20 mm wide and approx. 1.5 mm thick, is arranged to lie loosely on the upperside 18 of the container and extend through openings 19, arranged on the upperside 18 of the container, and down to the base portion 7 of the container 3 at the area of the respective partition wall 5 on each side of the same and is secured thereto.

The active suction capacity of the wick 11 between container compartments 12, 13 provided is interrupted so as to be able to prevent water transportation via the wick 11 between the container compartments 12, 13.

Said container 3, which is formed of tubular or hose-shaped parts of plastic material, is arranged to, with the respective ends thereof, easily be interconnectable with connecting containers 3 for the formation of a watering system S buryable in the ground 4.

The invention is based on the fact that water W is lifted out of the respective container 3 by means of capillary lifting force, and that the containers can work in different using areas: in smaller applications in flower vessels, flower beds, slopes having bushes, tree plantations, etc.; in wider contexts in order to provide young trees with water in reforesting in desert borders, and; under active-service conditions as for the provision of water to vegetables, palmtrees, banana, citrus, olive cultivations, etc., in areas having a strongly limited supply of water.

A substantial detail of the invention, which distinguishes it from previously known solutions, is that the containers 3 are provided with a double-sided water suction on each side of the provided partition wall. This entails that the product can be laid leaning in both directions and yet be fully functional next to the knuckle.

The suction function of the containers 3 is effected by a flat endless suction wick 11 applied in a narrow milled transverse hole 19. This hole 19 is placed substantially right over the V-shaped partition wall 5 of the pipe. The partition wall 5 is provided with a suction wick 11 on both sides by means of a specially made needle that applies the wick. In the same instant as the needle reaches the bottom of the pipe, the wick is ultrasonically welded or alternatively hot-melt glued in the bottom of the pipe. In order to prevent water from being transported from container to container, the wick is sealed in the top using hot-melt adhesive or by heat treatment, i.e., that capillary effects of the wick are interrupted along the top portion 15 of the preferably straight partition wall 5 by, for instance, hot-melt gluing 79 or cross-cutting the wick 11 by, for instance, being burnt or cut off. The wick parts above the partition wall are kept apart from each other at a distance X, which is at least 1.5 mm. In this way, each section will be entirely independent of the adjacent sections. This is an additional point where the present product differs substantially from previously patented solutions. This now entails, among other things, that, e.g., the hose or another formed container, can be damaged in one section without the adjacent sections, for that reason, ending function.

Preferably, the product is manufactured in a corrugated design in order to be flexible according to need. In addition, the strength of the hose increases by means of the corrugation. The strength/bearing capacity of the material thickness should be so high that a tractor of normal size should be able to drive over the hoses placed, for instance, 30 cm under the soil surface without deforming the hose system.

The length of the hose is determined by the manufacturer. As a supplement to the product, there is delivered an extension piece having sealing rings to make the hose extendable.

A start plug 20 having attachment for a water filler pipe may be included in the supplementary products of the product. Said plug 20 is provided with a sleeve coupling 21 where the filler pipe is applied. The filler pipe is provided with a cap. An end-sealing 22 plug terminates the system. Moreover, the corrugated design makes that the product becomes entirely insensitive to frost-shattering conditions.

In order for the capillary force not to be restrained, in the normal case, the pipe has to provided with deaeration every $5^{th}$ to $10^{th}$ meters. This is carried out by a pipe 23 reaching the ground surface 4A and being provided with a cap not completely tight. Said pipe 23 can also be provided with a level indicator, if the user has a need to be able to read the water level of the system. Said pipe is put into holes 24 for which there are markings on the upperside of the product; said markings is placed by the side of the location of the watering wick. At the markings, holes are drilled at suitable distances by, e.g., a reamer co-delivered for the purpose, more sparsely if the system is laid flat, and denser if it is laid disorderly so that negative pressure does not arise in the pipe. On the upperside of the container 3, the same is perforated with small holes in order to decrease the risk of negative pressure in the sections.

Since the product does not require water pressure, innumerable using areas open up. It can easily be filled using a bucket, hose, water inflow with constructed surface-water ditches, or in other simple ways be supplied with water. Naturally, it can also be automatized, if technology for this can be arranged on the location.

Most systems on the market are based on pressurized water, and this immediately causes problems upon damage of the systems. In addition, they require electricity, or petrol- or gasoline-driven pumps in order to create pressure. In many locations of watering system, it may be directly inappropriate to have pressurized water for different reasons.

In conditions of high ground surface temperature, the system is very efficient. This is so since the system is laid at a depth of 20-100 cm depending on the type of plant and ground. By means of this watering, the soil surface can be loosened in order to break the capillary force for surface dehumidification at the same time as the water containers can distribute the moisture in the root zone. The root zone is then established directly at a greater depth having lower temperature and a maximum water utilization. When water in this way is supplied slowly by capillary force directly in the root zone, the utilization of the supplied water can become about 95-98%. This is because evaporation is avoided and simultaneously the loss to the subsoil water is bypassed since the water already is capillary bound. See FIG. 1A, where a plant 98 with root system 99 is shown planted in the upper soil layer above a container 3.

A comparison with water sprinkling daytime is that 92% of supplied water is lost according to a study carried out at the Swedish University of Agricultural Sciences already in 1975. There is shown that 50% evaporated already during the sprinkling occasion; the rest of the loss resulted from the dissipation of free water passing straight through the soil layer down toward the subsoil water, and from high surface evaporation from a moist soil surface with full capillary refilling from below.

Another advantage of the invention is that, by the system, it is favourable to supply nutrients via the system and then up to 25% of the normal doses recommended in surface supply. In rain and watering, the surface supply causes great losses of the nutrient amount supplied, as free water brings the nutrients down to the subsoil water. By the system, not more nutrients are supplied than what, at the time, is lifted up and capillary bound. Hereby, the leaching is minimized.

In so-called "dead earths" (not cultivated or severly dried up earths where the micro life that decomposes nutrients into compounds useful for the roots is disabled) also microbes can be supplied without being damaged at the correct temperature and depth at the root zone, and thereby give the roots a good chance to develop and provide the plant material with nutrients.

A proceeding for the manufacture of a container arrangement 1 and consisting of plastic material according to the above-mentioned type is undertaken so that thermoplastic pipes, hoses, containers or other artefacts 3 of corrugated design are continuously extruded. Furthermore, a portion of a fabricated artefact 3 is subjected to counter-directed motion action for the provision of thickening of the plastic material layer along the intended portion I of the artefact. The thickened plastic material layer is the subject of combined mechanical indentation and suction action so that a corrugatedly wall-shaped portion 51 is formed internally in the artefact 3 at a mutual distance C from each other, and excessive plastic material is removed from the area of a formed partition wall 5, hole making in the artefact 3 formed and attachment of a laid-out wick 11 being allowed to be effected, preferably in the immediately subsequent step. For the provision of a double wedge-shaped partition wall 5, a wedge-shaped part 52 is allowed to be pressed into the warm plastic material. By means of, for instance, a milling cutter 106, said hole 19 is provided in the top portion 18 of the artefact 3 in the area above the provided partition wall 5, and through the provided hole 19 of the artefact 3, a portion of the wick 11 is allowed to be inserted by means of a combined pressure device 75 and welding tool for welding the wick 11 to the bottom 7 of the artefact 3 on each side 5A, 5B of the partition wall 5, preferably by ultrasonic welding. From the base portion of the artefact, an ultrasonic welding head 76 is inserted into the inner space of the double-walled partition wall for welding together the wick 11 on each side of said wall 5 and with simultaneous co-operation with pressing rollers 77, 78 that are inserted internally in the artefact 3 on each side of the wall 5 and act as anvils.

The preferably band-shaped wick 11 of fibre material is glued on along the top portion 15 of the preferably straight partition wall 5 by hot-melt gluing 79, or the wick 11 is sealed, i.e., capillary effects of the wick are interrupted along the top portion 15 of the preferably straight partition wall 5 by, for instance, hot-melt gluing 79 or cross-cutting the wick 11 by, for instance, being burnt or cut off.

Means for the manufacture of a device 1 according to the invention for watering purposes and comprising a water-collecting container that extends along the intended desired area to be watered and is arranged to be received in the ground, comprise a machine 100 intended for continuous extrusion of thermoplastic pipes, hoses or containers 3 of corrugated design and provided with at least two moulding stations 101, 102 that are arranged in a row one after the other and comprise mutually counter-directed corrugation mats 101A; 102A. In that connection, a subsequent moulding station 102 is arranged to be adversely drivable on, e.g., balls, wheels or rollers in the reversed counter-directed reception direction 97, diametrically opposite the normal feeding direction 96, so as to thicken the plastic layer along said portion I of the intended part of the extruded artefact 3; 3. A wedge-shaped indentation part 52 is actuatable to indent said thickened plastic layer transversely to the plastic injection direction 104 for the formation of a double-walled transverse wall 5 and sucking away of excessive plastic material and removal of the same by a suction apparatus 105. A milling cutter or a similar hole-making tool 106 is arranged to adversely to said double wall 5 mill a hole 19 in the plastic material before subsequent cooling.

A V- and plate-shaped wick insertion part 75 is movable transversely to the injection direction 104 and a welding set 76 is arranged to weld the wick 11 in the base portion 7 of the formed hose, etc., 3. In the centre of said supplied wick band 11, a hose 80 mouths for the supply of hot-melt adhesive 79 over the crest 15 of the wall 5 and on top of the folding over of the wick thereon. Capillary effects of the wick 11 can also be interrupted by the fact that the wick is cross-cut by being burnt or cut off using a pair of scissors.

Below, mechanical manufacturing solution of the invention is briefly given.

Step 1: The traditional corrugation mat for corrugation of the hose is supplemented with a counter-directed motion of the entire corrugation table so that more plastic should be obtained. Simultaneously, a delimitation wedge is pressed up and sucking away of excessive plastic is effected on the upperside of the hose.

Step 2: Here, the excessive plastic is milled away. Simultaneously, small air holes are milled on the upperside of the hose, etc.

Step 3: The fibre wick is installed using a sewing machine having a split needle. The needle is provided with two tips 77, 78 equipped with rollers for quick feeding of the wick. In this step, the wick is attached to both sides of the wedge-shaped wall.

Step 4: If it turns out that the wick does not stay properly, it is possible, from a manufacturing point of view, to instead retain the wick by means of a clip of plastic or metal. In such a case, it is pressed in place in this step.

Step 5: Cooling and reeling of the hose onto, for instance, reels holding Oct. 25, 1950 m according to market demands.

Supplementary Products

Sealing of hose ends is carried out by already existing end caps, possibly supplemented with sealing rings. It is possible to drill in filler pipes anywhere. This is solved using a thick reamer shipped with the product as a supplementary instrument. When the hose is laid in longer lengths, deaeration pipes should be fitted every $5^{th}$ or $10^{th}$ meter, in order to facilitate the water filling. This is depending on the quality of soil.

Below, a specified embodiment of the machine and the process thereof follow.

Extruder—a moulding-compound heater 200 having a cone-shaped outlet of a type previously known per se that provides the machining part with material.

The moulding station 101 including left table part-fixed table part having feeding-in mat/corrugation mat 101A, 101A provided with negative-pressure ducts in the tool mat in order to create the corrugation of the hose. The same type that is used today. The table is double-sided.

Moulding station 102 including right table part-movable table having similar containing corrugation mats 102A, 102A as table 1. This table reverses in order to provide a sufficient amount of moulding compound so as to create the essential partition wall of the hose. In the same step as this takes place, a wedge 52 acts from below and, by means of a suction apparatus and pressure, creates a perfect internal partition wall 5. Excessive moulding compound is simultaneously sucked upward.

A suction sleeve 105 that is attached onto the upper part of the hose 3. The excessive moulding compound is simultaneously pressed together and removed via an associated cutting step from the movable table. Then, the hose continues through the movable table part 102 and is cooled gradually.

When the hose leaves the movable table, a recessing step 106 of the wick holes 19 takes place before the hose 3 reaches the belt conveyor, etc., 300 on which it is cooled off.

Sewing machine part—this is the heart of the process and here the part of the process that is entirely new takes place. Through the milled holes 19 made, the endless suction wick 11 is fitted by means of a specially made needle function. Fibre fabric is used as a wick 11, and this has a width of 20 mm and a thickness of approx. 1.5 mm. This is tested to provide good capillary properties and durability. The wick 11 is fitted by means of a flat hollow resilient needle unit 75, which is made fast by a tensioning/guide wheel. The wick 11 is inserted into the needle 75 by mounted process rollers 77, 78 in the needle base. This is in order to keep the wick in place both in upward and downward motions. In front of the front needle parts, a guide roller is placed. The front part is manufactured flat and hollow as well as mouths at the first feeding and anvil roller of the needle tip. At said roller, the ultrasonic welding in the bottom of the hose takes place. The rear needle part is also provided with a flat locating hole in the needle immediately above the mounted guide/anvil roller of the needle tip. Here, the bottom roller is also ultrasonically welded to the same. In the centre of the needle, a metal-lined hose 80 mouths, for hot-melt gluing of the wick on the crest where the wick turns over to the next section. This step takes place in order to prevent over-feeding of water from section to section. The metal-lined hose can be kept warm, even if the heating of the hot-melt adhesive 79 is made further away from the gluing spot. From the underside, the wedge-shaped ultrasonic welding head 77 is pushed up against the bottom of the hose where the anvil rollers abut on the inside. In this way, the wick 11 is applied double-sided around the partition wall 5 and then runs freely on the upperside 10 of the hose 3 along the entire length thereof. The entire process is automated by means of electrical sensors.

The feed of the wick.

Ultrasonic welding head.

The hose is sawn/burnt off into manageable predetermined lengths that can be varied depending on the interests of the customer. The hose can be spliced or cross-cut at each flat section.

The function and nature of the invention should have been understood by what has been mentioned above but the invention is naturally not limited to the embodiments described above and shown in the accompanying drawings. Modifications are feasible, particularly as for the nature of the different parts, or by using an equivalent technology, without departing from the protection area of the invention, such as it is defined in the claims.

The invention claimed is:

1. A water-collecting container for extending along an area to be watered and being received in the ground, comprising:
    an internal transverse double partition wall that divides the container into container compartments, the two walls of the double partition wall extending from a base portion of the container up to at least half an effective height (H) of the container, and
    a liquid-sucking wick along an outside of the container that is connected to internal liquid-receiving spaces of the container at a mutual distance (A) from each other as seen along a length (L) of the container,
    wherein the wick is arranged to extend through openings on an upper side of the container to base portions of the container at an area of a respective partition wall on each side of the same, and
    an active suction capacity of the wick between container compartments is interrupted in order to prevent water transportation by the wick between the container compartments.

2. The device of claim 1, wherein the container is tubular and has a corrugated wall shape as seen along the length (L) of the container.

3. The device of claim 1, wherein ends of the container are arranged so that they are interconnectable in row form to a desired length.

4. The device of claim 1, wherein the partition walls lean and diverge from an upper merging top portion in a direction obliquely downward.

5. The device of claim 1, wherein the partition walls extend up to a level of the container that is at least 80% of the height (H).

6. The device of claim 1, wherein the wick comprises a band-shaped fiber fabric, is arranged to lie loosely on the upper side of the container, and is secured in the container on each side of the double partition wall.

7. The device of claim 1, wherein the container is formed of tubular or hose-shaped parts of plastic material that have ends configured for interconnection with connecting containers, thereby forming a watering system buryable in the ground.

8. A method of manufacturing a water-collecting container according to claim 1, wherein articles are continuously extruded in a form of thermoplastic corrugated pipes, hoses, or containers; portions of a fabricated article are subjected to counter-directed motion action for thickening a plastic material layer along intended portions (I) of the article; the thickened plastic material layer is subjected to combined mechanical indentation and suction action so that a corrugated wall-shaped portion is formed internally in the article at a mutual distance (C) from each other; and excess plastic material is removed from an area of a formed partition wall, making a hole in the article formed and enabling attachment of a laid-out wick.

9. The method of claim 8, wherein a wedge-shaped part is pressed into warm plastic material to provide a wedge-shaped double partition wall.

10. The method of claim 9, wherein holes are formed in a top portion of the article in an area above the partition wall.

11. The method of claim 10, wherein, through the hole in the article, a portion of the wick is inserted by a combined pressure device and welding tool for welding the wick to a bottom of the article on each side of the double partition wall.

12. The method of claim 11, wherein an ultrasonic welding head is inserted into an inner space of the double partition wall from a base portion of the article for welding together the wick on each side of the wall with simultaneous co-operation with pressing rollers that are inserted internally in the article on each side of the wall and that act as anvils.

13. The method of claim 11, wherein the wick is a band-shaped fiber material and is sealed such that capillary action of the wick is interrupted along a top portion of the double partition wall.

14. An apparatus for manufacturing a water-collecting container according to claim 1, comprising a machine configured for continuous extrusion of thermoplastic corrugated pipes, hoses, or containers having at least two molding stations that include mutually counter-directed corrugation mats, one molding station of which being arranged to be driven adversely in a reverse direction to thicken a plastic layer along a portion of an extruded article, a wedge-shaped indentation part being actuatable to indent the thickened plastic layer transversely to an injection direction to form a transverse double partition wall, and having a suction apparatus being configured to subsequently suck away excess plastic material.

15. The apparatus of claim 14, wherein a milling cutter is arranged adversely to the double partition wall to mill a hole for the wick in the plastic material before subsequent cooling.

16. The apparatus of claim 15, wherein a V-and plate-shaped wick insertion part is movable transversely to an injection direction, and a welding set is arranged to weld the wick in a base portion of a formed part.

17. The apparatus of claim 16, wherein, in a center of the part, a hose mouth is disposed to supply hot-melt adhesive over a crest of the double partition wall and on top of the wick folding over thereon.

* * * * *